United States Patent
Peng et al.

(10) Patent No.: US 7,675,256 B2
(45) Date of Patent: Mar. 9, 2010

(54) CONTROLLER FOR DC BRUSHLESS MOTOR INTEGRATED WITH A HIGH VOLTAGE CONTROL SYSTEM

(75) Inventors: Aiqian Peng, Zhongshan (CN); Maosen Zeng, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 88 days.

(21) Appl. No.: 11/764,210

(22) Filed: Jun. 17, 2007

(65) Prior Publication Data

US 2008/0050100 A1      Feb. 28, 2008

(30) Foreign Application Priority Data

Aug. 28, 2006    (CN) .................... 2006 2 0063833 U

(51) Int. Cl.
*H02P 6/00* (2006.01)
(52) U.S. Cl. .............................. 318/400.01; 318/254.1; 318/400.3; 318/400.38; 318/560
(58) Field of Classification Search .............. 318/254.1, 318/400.01, 400.3, 400.38, 560, 577
See application file for complete search history.

(56) References Cited

U.S. PATENT DOCUMENTS

| | | | | |
|---|---|---|---|---|
| 5,463,299 A | * | 10/1995 | Futami et al. ................ 318/618 |
| 5,694,010 A | * | 12/1997 | Oomura et al. ........ 318/400.07 |
| 5,731,681 A | * | 3/1998 | Inaniwa et al. .............. 318/729 |
| 6,060,851 A | * | 5/2000 | Imai et al. .................... 318/437 |
| 6,157,181 A | * | 12/2000 | Ueda .......................... 323/282 |
| 6,278,248 B1 | * | 8/2001 | Hong et al. .............. 318/400.3 |
| 7,262,568 B2 | * | 8/2007 | Takada .................... 318/400.3 |

* cited by examiner

*Primary Examiner*—Bentsu Ro
*Assistant Examiner*—Thai Dinh
(74) *Attorney, Agent, or Firm*—Matthias Scholl P.C.; Scholl, Matthias

(57) ABSTRACT

Taught herein is a controller for a direct current brushless motor connected to a high voltage control system, comprising a microprocessor and an input/output interface circuit connected between the high voltage control system and the microprocessor; wherein the input/output interface circuit is a step-down circuit for transforming a high voltage control signal into a low-voltage control signal. The controller enables the high voltage control system to cooperate with motor, therefore a user is not necessary to design a new high voltage control system when replacing the conventional AC motor with the DC brushless motor, which saves time, and reduces cost.

7 Claims, 4 Drawing Sheets

CONTROLLER FOR DC BRUSHLESS MOTOR INTEGRATED WITH A HIGH VOLTAGE CONTROL SYSTEM

CROSS-REFERENCE TO RELATED APPLICATIONS

This application claims priority to Chinese Patent Application No. 200620063833.3 filed on Aug. 28, 2006, the contents of which are incorporated herein by reference.

BACKGROUND OF THE INVENTION

1. Field of the Invention

The invention relates to a controller for a motor, and more particularly to a controller for a direct-current (DC) brushless motor integrated with a high voltage control system.

2. Description of the Related Art

Conventional alternating-current (AC) electric motors are widely used in industrial applications, such as, e.g., air-conditioners, refrigerators, fan, etc. Although the AC motors feature simple circuit structure, they also suffer from problems, including high level of noise, high failure rate, high power consumption, unstable operation, and inability to provide intelligent and complex control.

With the advent of DC brushless motors, the above problems have been largely eliminated. However, as the AC motor is being replaced with the DC brushless motor, the previous high voltage control system connected to the AC motor can no longer be used, and a new high voltage control system has to be designed.

SUMMARY OF THE INVENTION

In view of the above-described problems, it is one objective of the invention to provide a controller for a direct current brushless motor connected to a high voltage control system so as to enable the high voltage control system to cooperate with the DC brushless motor.

To achieve the above objectives, in accordance with one embodiment of the invention, provided is a controller for a direct current brushless motor connected to a high voltage control system, comprising a microprocessor and an input/output interface circuit connected between the high voltage control system and the microprocessor; wherein the input/output interface circuit is a step-down circuit for transforming a high voltage control signal into a low-voltage control signal.

In certain classes of this embodiment, the input/output interface circuit is a step-down rectifying circuit for transforming a high voltage alternating current control signal into a low-voltage direct-current control signal.

In certain classes of this embodiment, the step-down rectifying circuit comprises a photoelectric isolation means.

In certain classes of this embodiment, the step-down rectifying circuit with the photoelectric isolation means is a resistance-type step-down circuit.

In certain classes of this embodiment, the step-down rectifying circuit with the photoelectric isolation means is a capacitance-type step-down circuit.

In certain classes of this embodiment, the step-down circuit is a resistance-type step-down circuit.

In certain classes of this embodiment, the step-down circuit is a capacitance-type step-down circuit.

In certain classes of this embodiment, the controller further comprises an integrated power module for driving the direct-current brushless motor.

In certain classes of this embodiment, an output end of the microprocessor is connected to an input end of the integrated power module.

In certain classes of this embodiment, the direct-current brushless motor further comprises a stator and a permanent magnetic rotor magnetically coupled to the stator.

In certain classes of this embodiment, an output end of the integrated power module is connected to a winding of the stator.

In certain classes of this embodiment, the controller for a direct current brushless motor connected to a high voltage control system further comprises a rotor position sensing circuit for sensing a location of the permanent magnetic rotor.

In certain classes of this embodiment, an input end of the rotor position sensing circuit is connected to an output end of the integrated power module or is connected to the detector serving to detect the position of the permanent magnet rotor.

In certain classes of this embodiment, an output end of the rotor position sensing circuit is connected to an input end of the microprocessor.

In certain classes of this embodiment, the controller for a direct current brushless motor connected to a high voltage control system further comprises a current-sensing circuit for sensing current flowing through the direct-current brushless motor.

In certain classes of this embodiment, an input end of the current-sensing circuit is connected to an output end of the integrated power module.

In certain classes of this embodiment, an output end of the current-sensing circuit is connected to an input end of the microprocessor.

In certain classes of this embodiment, the controller for a direct current brushless motor connected to a high voltage control system further comprises a power source circuit for supplying power to all parts of the controller.

Compared with the prior art, the controller for a DC brushless motor connected to a high voltage control system enables the high voltage control system to cooperate with the DC brushless motor. Therefore it is not necessary to design a new high voltage control system when replacing the conventional AC motor with the DC brushless motor, which saves time and reduces cost.

BRIEF DESCRIPTION OF THE DRAWINGS

The objects and advantages of the invention will become more readily apparent after reading the ensuing descriptions of the non-limiting illustrative embodiment and viewing the accompanying drawings, in which.

DETAILED DESCRIPTION OF THE INVENTION

Figure 1:
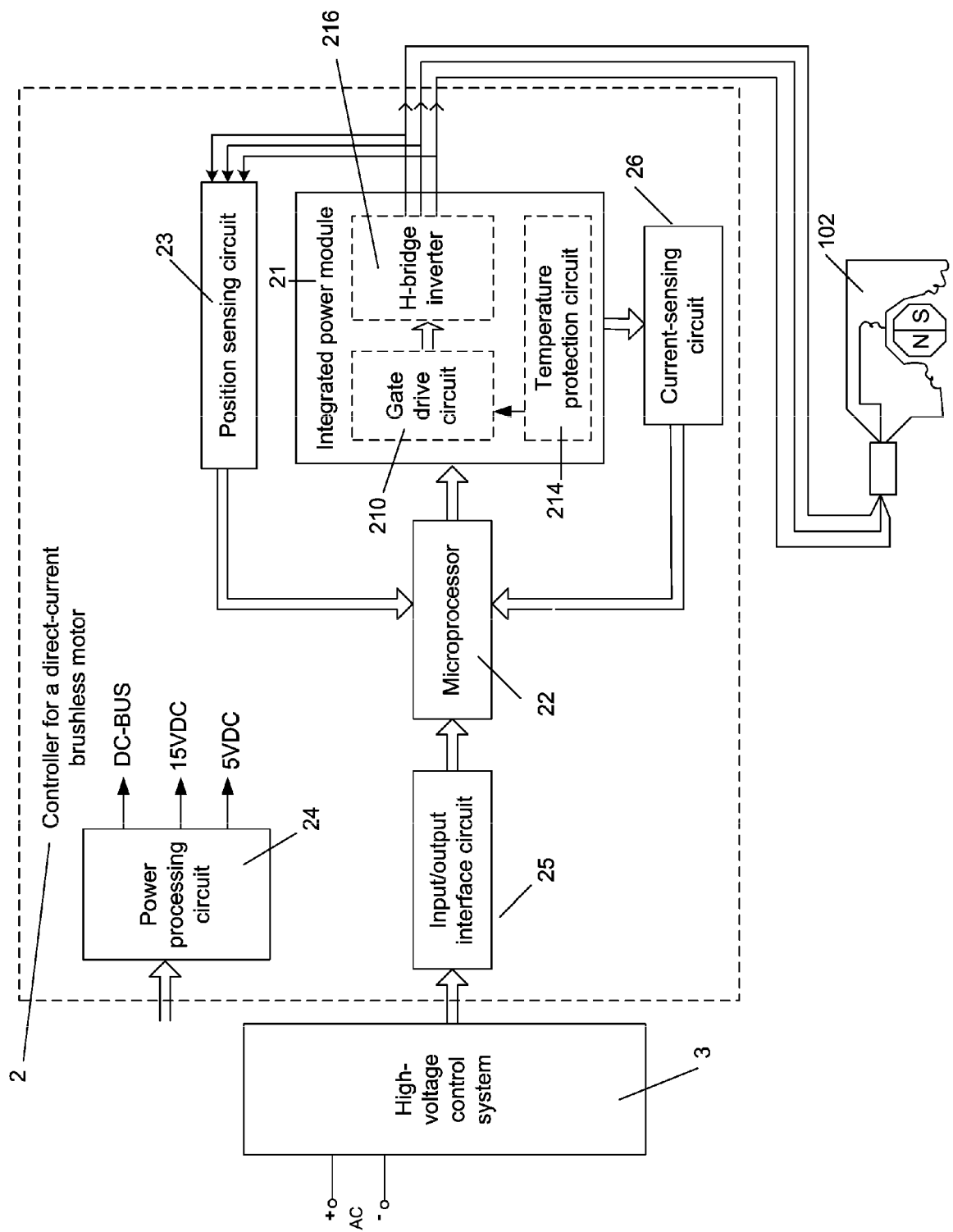
FIG. 1 is a block circuit diagram of the controller of a direct current brushless motor according to one embodiment of the invention.

As shown in FIG. 1, a controller 2 for a direct current (DC) brushless motor is connected to a high voltage control system 3, and comprises an integrated power module 21, a microprocessor 22, a rotor position sensing circuit 23, a power source circuit 24, an input/output (input/output) interface circuit 25, and a current-sensing circuit 26.

In addition to the controller 2, the motor also comprises a stator and a permanent magnetic rotor magnetically coupled to the stator.

The integrated power module 21 has the function of driving the motor. An output end of the integrated power module 21 is connected to a winding 102 within the stator.

The integrated power module 21 comprises a gate drive circuit 210, an H-bridge inverter 212, and a temperature-protection circuit 214.

An output end of the microprocessor 22 is connected to an input end of the integrated power module 21.

The rotor position sensing circuit 23 has the function of sensing a location of the permanent magnetic rotor. An output end of the rotor position sensing circuit 23 is connected to an input end of the microprocessor 22. An input end of the rotor position sensing circuit 23 is connected to an output end of the integrated power module 21, or is connected to the detector serving to detect the position of the permanent magnet rotor.

The power source circuit 24 has the function of supplying power to all parts of the controller 2. An input end of the power source circuit 24 is connected to an external power supply.

An input end of the input/output interface circuit 25 is connected to the high voltage control system 3, and an output end thereof is connected to an input end of the microprocessor 22. The input/output interface circuit 25 is a step-down rectifying circuit for transforming a high voltage control signal into a low-voltage control signal.

The current-sensing circuit 26 has the function of sensing current flowing through the motor. An output end of the current-sensing circuit 26 is connected to an input end of the microprocessor 22. An input end of the current-sensing circuit 26 is connected to an output end of integrated power module 21.

Figure 2:
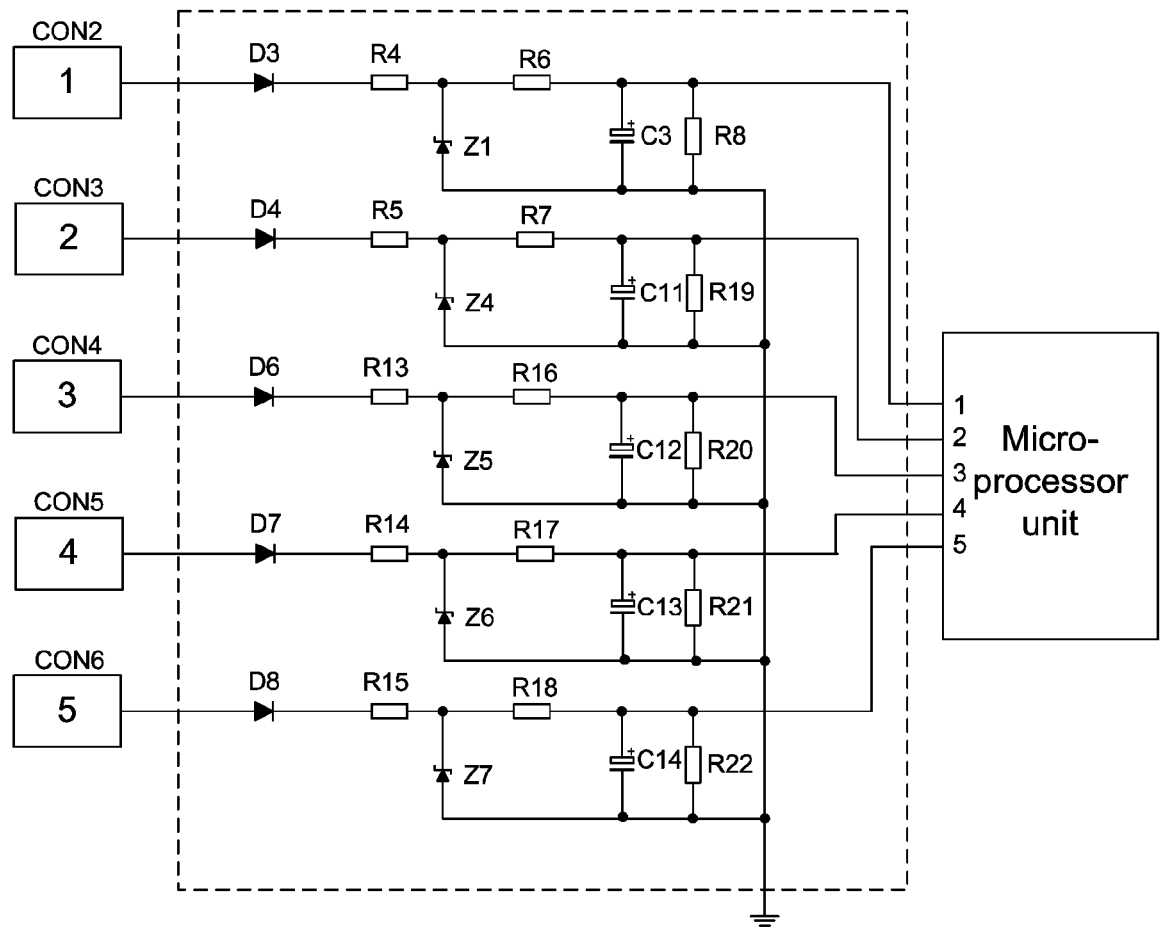
FIG. 2 is a circuit diagram of the input/output circuit according to one embodiment of the invention.

As shown in FIG. 2, the input/output interface circuit 25 is a resistance-type step-down circuit. Five high voltage control signals CON1 consecutively through CON5 generated by the high voltage control system 3 are transmitted to the microprocessor 22 via the resistance-type step-down circuit. Five high voltage control signals CON1 consecutively through CON5 is transformed into five low voltage direct current control signal consecutively by the resistance-type step-down circuit. The microprocessor 22 controls the motor to operate according to the five low voltage direct current control signal consecutively.

Figure 3:
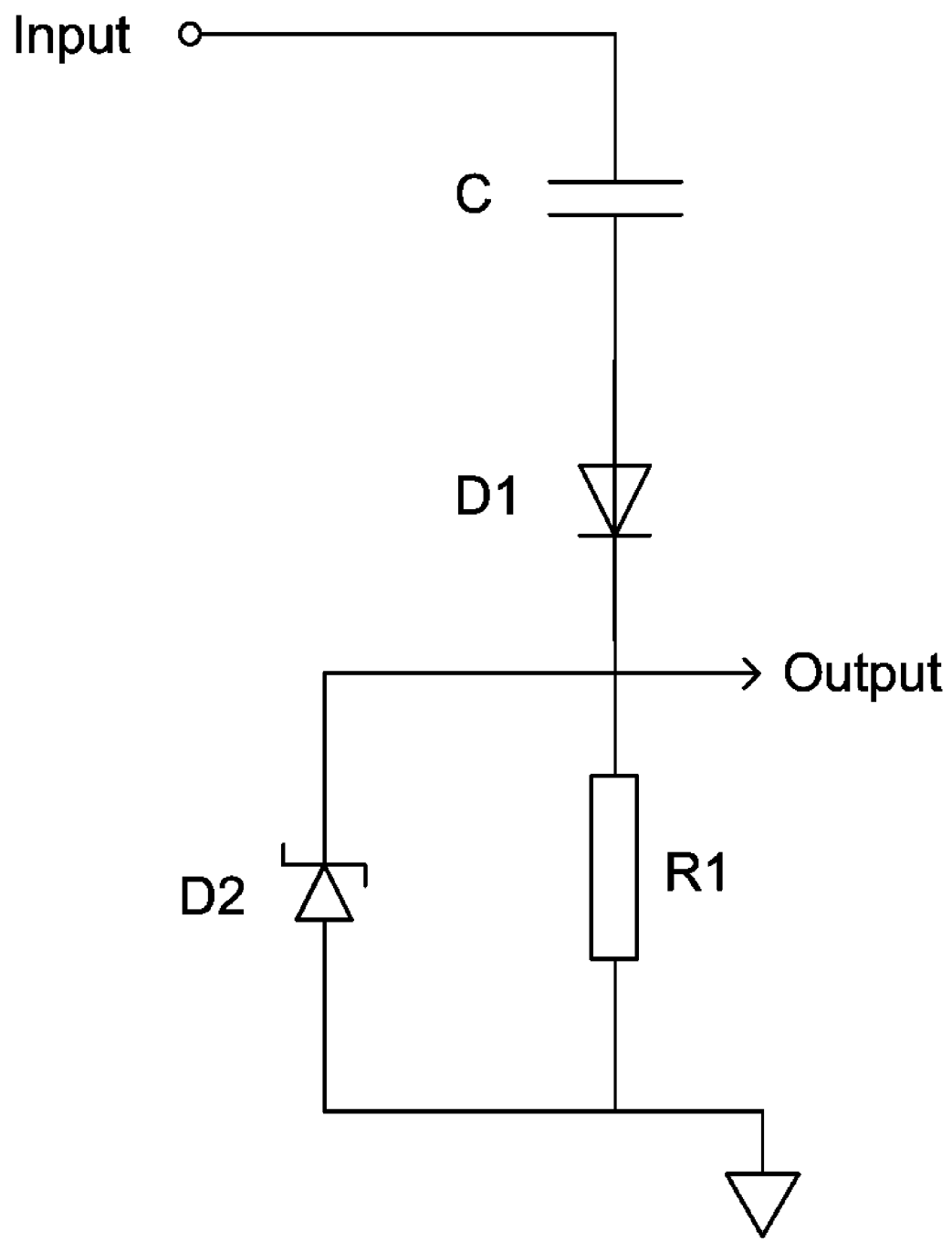
FIG. 3 is a circuit diagram of an input/output circuit according to another embodiment of the invention.

As shown in FIG. 3, the input/output interface circuit 25 is in other embodiment a capacitance-type step-down circuit.

Figure 4:
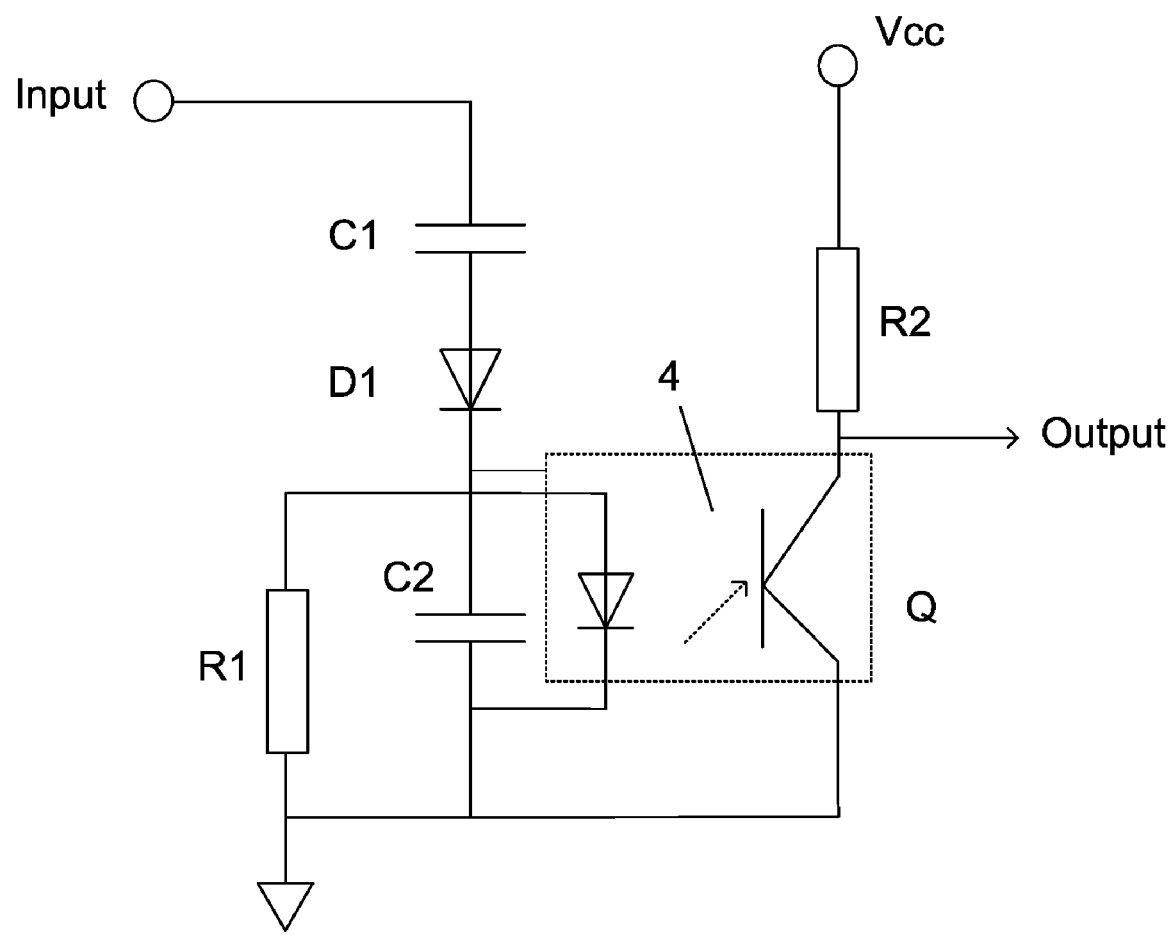
FIG. 4 is a circuit diagram of an input/output circuit according to yet another embodiment of the invention.

As shown in FIG. 4, the input/output interface circuit 25 in other embodiment comprises a photoelectric isolation means 4. The input/output interface circuit 25 with the photoelectric isolation means is a resistance-type step-down circuit, or a capacitance-type step-down circuit.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. a controller for a direct current brushless motor connected to a high voltage control system, comprising
    a microprocessor;
    an input/output interface circuit connected between said high voltage control system and said microprocessor;
    a rotor position sensing circuit;
    an integrated power module;
    a current-sensing circuit for sensing current flowing through the motor; and
    a power source circuit for supplying power to said microprocessor, said integrated power module, said input/output interface circuit, said current-sensing circuit, and said rotor position sensing circuit;
    wherein
    said input/output interface circuit is a step-down circuit for transforming high voltage alternating current control signal into a low-voltage direct current control signal;
    an input end of said rotor position sensing circuit is connected to an output end of said integrated power module;
    an output end of said rotor position sensing circuit is connected to an input end of said microprocessor;
    an input end of said current-sensing circuit is connected to an output end of the integrated power module;
    an output end of the current-sensing circuit is connected to an input end of said microprocessor; and
    said step-down rectifying circuit comprises a photoelectric isolation means.

2. The controller of claim 1, wherein said step-down rectifying circuit with said photoelectric isolation means is a resistance-type step-down circuit.

3. The controller of claim 2, wherein said resistance-type step-down circuit comprises: a diode, a Zener diode, a first resistor, a second resistor, a third resistor, and a capacitor, and wherein said first diode is connected in series with said first resistor and said second resistor, and said Zener diode is connected between said first resistor and said second resistor and in parallel with said capacitor and said third resistor.

4. The controller of claim 1, wherein said step-down rectifying circuit with said photoelectric isolation means is a capacitance-type step-down circuit.

5. The controller of claim 4, wherein said capacitance-type step-down circuit comprises: a capacitor, a first diode, a second diode, and a resistor, and wherein the capacitor is connected in series with the first diode and the resistor and the second diode is connected in parallel with the resistor.

6. The controller of claim 1, wherein said integrated power module comprises a gate drive circuit, an H-bridge inverter, and a temperature protection circuit.

7. The controller of claim 1, wherein said photoelectric isolation means comprises a light emitting diode and a phototransistor, said light emitting diode being connected in parallel with a capacitor and said phototransistor being connected in series with a resistor.

\* \* \* \* \*